G. MOE.
PHOTOGRAPHIC MEASURING DEVICE.
APPLICATION FILED AUG. 28, 1919.
1,418,602.   Patented June 6, 1922.
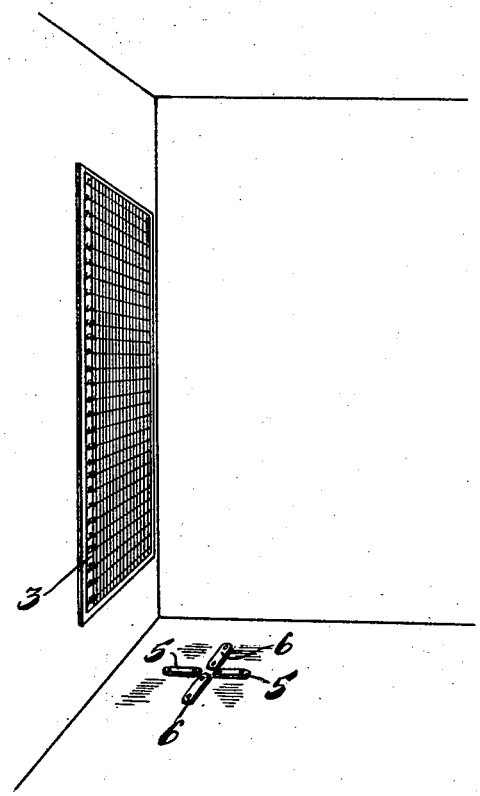
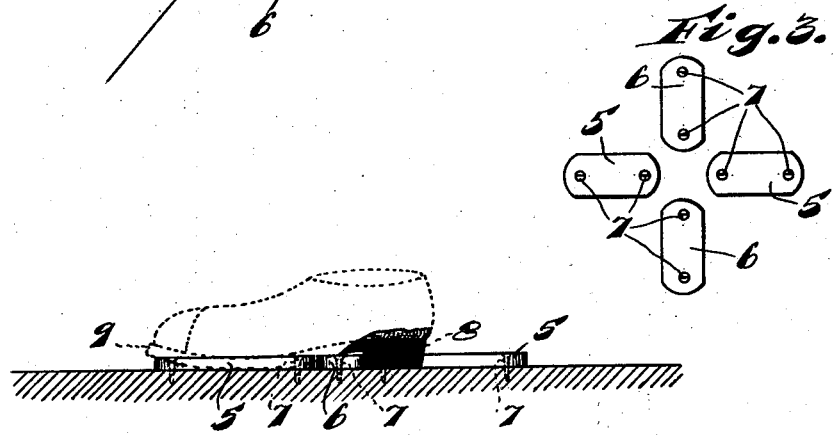
Witnesses:
C. E. Wessels
Thos. S. Donnelly
Inventor:
Gerhard Moe,
By Joshua R. H. Potts
Attorney.

UNITED STATES PATENT OFFICE.

GERHARD MOE, OF EAU CLAIRE, WISCONSIN.

PHOTOGRAPHIC MEASURING DEVICE.

1,418,602.            Specification of Letters Patent.   Patented June 6, 1922.

Application filed August 28, 1919. Serial No. 320,506.

*To all whom it may concern:*

Be it known that I, GERHARD MOE, a citizen of the United States, and a resident of the city of Eau Claire, county of Eau Claire, and State of Wisconsin, have invented certain new and useful Improvements in Photographic Measuring Devices, of which the following is a specification.

My invention relates to new and useful improvements in photographic measuring devices, and has for its object the provision of a device whereby the object measured may be quickly and accurately disposed at a predetermined distance from a photographic measuring chart. Other objects will appear hereinafter.

The invention consists in the combinations and arrangements of parts hereinafter described and claimed.

The invention will be best understood by reference to the accompanying drawings forming a part of this specification, and in which, Fig. 1 is a perspective view of my invention, showing its relative position to a measuring chart.

Fig. 2 is a vertical sectional view of my invention, showing its use.

Fig. 3 is a top plan view of my invention.

My invention is designed to be used in conjunction with a photographic measuring chart which is used for taking a person's measurements by photographing the person positioned before the chart. The photographic chart to which reference is made, is used for taking the measurements of a person, and is especially useful for mail order tailoring houses. The person to be measured is placed before the measuring chart and photographed, the measuring chart serving as a back ground. This measuring chart is divided into a number of squares of known dimension. The image of the person, as the same appears in the photograph, is disposed against the chart as a back ground, and the image of the person's body covers a certain number of the squares, depending upon the measurements of the person. Each of these squares indicates a certain distance, and consequently the dimensions or measurements of the person can be accurately and quickly determined from an inspection of these squares. In order that the image of the person, as the same appears upon the chart back ground of the photograph, may be accurately registered there, it is necessary that the person be a predetermined distance from the photographic measuring chart when the photograph is made. It is also necessary that the camera by which the photograph is taken, be a predetermined distance from the chart. The camera generally is rigidly mounted a predetermined distance from the measuring chart, and it is then necessary merely to position the person to be photographed the requisite predetermined distance from the chart. Various methods have been employed to position the person the requisite distance from the chart, such as, for instance, marking a line upon the floor, but the average person does not readily assume the required position, with a consequent loss of considerable time. My invention consists in a device which is designed to afford a means of positioning the person to be measured the requisite distance from the chart with a minimum loss of time.

The approved form of construction consists of cross members 5 and 6, the members 5 extending perpendicularly to the plane of the chart 3, the members 6 being at right angles to the members 5. The members 5 and 6 are secured to the floor or base in conjunction with which the chart 3 is used, by suitable fastening means 7, a predetermined distance from the chart 3. In use, the person to be measured is placed with the front edge of the heels 8 of his shoes against one edge of one pair of the cross members, the other pair of cross members extending between the shoes of the person, the edge of the sole 9 of the shoes lying in engagement with the members that extend between the same. In this manner the person is afforded a means of assuming a position which is the proper distance from the photographic chart, and centrally positioned relatively thereto. The members 5 and 6 being crossed in the manner indicated, the person to be measured may readily assume a position at the proper distance from the chart, facing different directions.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent, is:—

1. In combination with a photographic measuring chart, a plurality of heel locating members positioned a predetermined distance from said chart and disposed at right angles to each other, one of said members extending perpendicularly to said chart, substantially as described.

2. In combination with a photographic measuring chart, a plurality of heel locating members positioned a predetermined distance from said chart and disposed at right angles to each other, a pair of said members extending perpendicularly to said chart, and one pair of said members being adapted to be engaged by the heels of the person to be measured and the other pair of said members extending longitudinally between the feet of the person to be measured, substantially as described.

3. In combination with a photographic measuring chart, a plurality of heel locating members disposed at right angles to each other and adapted to engage the object measured with said chart, substantially as described.

In testimony whereof I have signed my name to this specification in the presence of two subscribing witnesses.

GERHARD MOE.

Witnesses:
H. R. GILBERTSON,
A. J. SUTHERLAND.